US 6,500,403 B2
Dec. 31, 2002

(12) United States Patent
Ward

(10) Patent No.: US 6,500,403 B2
(45) Date of Patent: Dec. 31, 2002

(54) PROCESS FOR THE PRODUCTION OF HYDROGEN

(75) Inventor: Andrew Mark Ward, Cleveland (GB)

(73) Assignee: Imperial Chemical Industries PLC, London (GB)

(*) Notice: Subject to any disclaimer, the term of this patent is extended or adjusted under 35 U.S.C. 154(b) by 11 days.

(21) Appl. No.: 09/814,926

(22) Filed: Mar. 23, 2001

(65) Prior Publication Data

US 2001/0024632 A1 Sep. 27, 2001

Related U.S. Application Data

(63) Continuation of application No. PCT/GB99/02954, filed on Sep. 6, 1999.

(51) Int. Cl.$^7$ .............................. C01B 3/16; C01B 31/20
(52) U.S. Cl. .................... 423/656; 423/437.2; 252/373
(58) Field of Search ..................... 252/373; 423/437.2, 423/656

(56) References Cited

U.S. PATENT DOCUMENTS

| 4,021,366 A | * | 5/1977 | Robin et al. ................. 252/373 |
| 4,861,745 A | | 8/1989 | Huang et al. ................ 502/314 |

FOREIGN PATENT DOCUMENTS

| EP | 0361648 | 4/1990 | ............. C01B/3/48 |
| GB | 2087855 | 6/1982 | ............. C01B/3/16 |

* cited by examiner

*Primary Examiner*—Stanley S. Silverman
*Assistant Examiner*—Maribel Medina
(74) *Attorney, Agent, or Firm*—Pillsbury Winthrop LLP

(57) ABSTRACT

A high temperature shift process using an iron oxide-containing catalyst wherein the feed gas is contacted with an iron-free, copper-containing, catalyst at an inlet temperature in the range 280–370° C. before contact with the iron oxide-containing catalyst in order to effect some shift reaction and thus avoid conditions conducive to over-reduction of the iron oxide containing catalyst.

13 Claims, No Drawings

PROCESS FOR THE PRODUCTION OF HYDROGEN

This application is a continuation of PCT/GB99/02954, filed Sep. 6, 1999.

This invention relates to hydrogen and in particular to the production of a hydrogen-containing gas stream from a carbonaceous feedstock. Such processes are well known and involve the steam reforming of a hydrocarbon feedstock, e.g. natural gas, or of a hydrocarbon derivative e.g. methanol, or the partial oxidation, using an oxygen-containing gas, e.g. substantially pure oxygen, air, or oxygen-enriched or oxygen-depleted air, of a hydrocarbon, or hydrocarbon derivative, feedstock or of a solid carbonaceous feedstock such as coal. Such gas generation processes produce a gas stream at a relatively high temperature, normally above 700° C., containing hydrogen, carbon monoxide, and steam, and usually also some carbon dioxide. The gas stream will normally contain some methane together with any inert gases, e.g. nitrogen, that were present in the reactants.

In order to increase the hydrogen content of the gas stream it is well known to subject the gas stream to the shift reaction $$CO + H_2O \rightarrow CO_2 + H_2$$

by passage of the gas through a bed of a suitable catalyst.

The forward shift reaction equilibrium is favoured by low temperatures. However since the reaction is exothermic, unless steps are taken such as cooling the gas while in the catalyst bed, the temperature rise occurring if the feed contains a substantial amount of carbon monoxide is often such that low outlet temperatures can not achieved and/or the catalysts effective at low outlet temperatures are rapidly de-activated. For this reason the shift reaction is often carried out in two stages; the first stage (high temperature shift) employing a catalyst comprising iron oxide, e.g. an iron oxide/chromia catalyst, and, after some form of inter-bed cooling, the second stage (low temperature shift) employing a copper-containing catalyst.

In use, the iron oxide in the high temperature shift catalyst may be reduced to a state wherein the catalyst tends to catalyse the Fischer-Tropsch reaction forming hydrocarbons. Reduction of the iron oxide to such a state is thus desirably avoided. We have found that for high temperature shift using conventional iron oxide/chromia catalysts and conventional high temperature shift exit temperatures, e.g. in the range of about 350–500° C., the risk of hydrocarbon formation depends upon the molar ratio of carbon monoxide to carbon dioxide and the proportion of steam in the shift inlet gas. The risk of hydrocarbon formation increases as the carbon monoxide to carbon dioxide ratio increases: however provided sufficient steam is present, the risk may be minimised.

The gasification stage used to produce the shift inlet gas is normally operated at a pressure in the range 5 to 50 bar abs., and in particular in the range 10 to 40 bar abs. The temperature at which the gasification stage is effected will normally be in the range 700 to 1200° C., particularly 750 to 1100° C.

The carbon monoxide to carbon dioxide molar ratio and the proportion of steam will depend on the conditions employed in the gasification stage, i.e. the reforming or partial oxidation stage. Increasing the outlet temperature, increasing the pressure, and/or decreasing the steam to feedstock carbon ratio (i.e. moles of steam per g atom of feedstock carbon) employed in the gasification stage, all tend to increase the risk of hydrocarbon formation in the shift stage.

Generally to minimise risk of formation of hydrocarbons in a subsequent high temperature shift stage employing an iron oxide catalyst, it has generally been necessary to employ a gas mixture containing a substantial amount of steam (so that the steam to dry gas molar ratio is greater than about 0.5) and/or to employ gasification conditions such that the molar ratio of carbon monoxide to carbon dioxide in the gas stream is limited to no more than about 1.9.

Where the gasification process involves steam reforming, it is possible to operate with a sufficient excess of steam that such problems are avoided. However the generation of such an excess of steam is not energy efficient and, in the interests of economy, it is desirable to operate steam reforming processes at low steam to carbon ratios so that the reformed gas stream fed to the shift stage has a relatively low steam to dry gas molar ratio, particularly below 0.6. Indeed practical steam reforming processes generally give gas compositions having a steam to dry gas molar ratio in the range 0.2 to 0.6. Likewise, with partial oxidation processes, the carbon monoxide content of the gas stream is generally at a level at which hydrocarbon formation would present a problem. While these difficulties can be overcome by the injection of steam prior to the shift reaction, the amount of such injected steam is desirably minimised in the interests of economy. For each mole of carbon monoxide converted in the shift reaction a mole of steam is required but the amount of steam required to avoid the risk of hydrocarbon formation is generally much greater than that required simply to have a steam to carbon monoxide molar ratio of at least 1.0.

It has been proposed in U.S. Pat. No. 5,030,440 to overcome these problems by employing a preliminary shift stage at a temperature above 550° C. using an iron-free catalyst such as a calcium aluminate support impregnated with palladium.

We have devised an alternative process wherein the preliminary shift stage is effected at a lower temperature, thus enabling a greater amount of heat recovery to be effected before the shift stage.

It has been proposed in U.S. Pat. No. 4,861,745 to reduce the risk of hydrocarbon formation by including a small proportion of copper in the iron oxide-containing high temperature shift catalyst. However it has been found in practice that this is only partially effective: thus the presence of copper in the iron oxide-containing catalyst merely retards the rate at which the latter is reduced to a state in which the formation of hydrocarbons is catalysed.

In the present invention, the risk of hydrocarbon formation is decreased by contacting the gas stream with an iron-free, copper-containing, catalyst prior to contacting the gas with the iron-containing catalyst.

Accordingly the present invention provides a shift process wherein a gas stream containing carbon monoxide and steam is contacted with an iron oxide-containing catalyst, characterised in that, prior to contact with the iron oxide-containing catalyst, the gas stream is contacted with an iron-free, copper-containing, catalyst at an inlet temperature in the range 280–370° C.

Iron-free, copper-containing, catalysts are normally employed for the so-called "low-temperature" shift reaction which often follows a stage of high temperature shift reaction. Normally catalysts containing a substantial proportion of copper are not employed at temperatures above about 300° C. as the copper tends to sinter and so the catalyst loses activity. However, in the present invention, although some sintering and loss of activity will inevitably occur, the copper-containing catalyst is not required to effect shift to near equilibrium but only to effect some degree of shifting to modify the carbon monoxide to carbon dioxide ratio so that the problem of undue reduction of the subsequent iron oxide-containing catalyst and consequent Fischer-Tropsch reactions is avoided. Furthermore, although the inlet temperature to the preliminary shift stage is relatively low for a high temperature shift reaction, it is high for a shift reaction employing a catalyst containing a substantial proportion of copper, and this relatively high inlet temperature compensates for the loss of activity of the copper catalyst.

Copper-containing catalysts that may be employed include any of those well known for the methanol synthesis or the low temperature shift reaction. Typically the catalyst comprises the product of reducing pellets formed from a calcined composition of co-precipitated copper, zinc and aluminium and/or chromium compounds, e.g. oxides, hydroxides or basic carbonates. Often such catalysts contain more than 20% by weight of copper. Other components such as magnesium or manganese compounds may be incorporated. In a preferred system however, the copper-containing catalyst is the product of reducing a catalyst precursor comprising copper compounds supported on a material such as alumina or a calcium aluminate cement. Such a precursor may be produced by impregnating the support with a solution of a thermally decomposable copper compound, and optionally other components such as zinc, magnesium, aluminium and/or chromium compounds, followed by calcination of the impregnated support to decompose the copper compound, and possibly other components, to the oxidic state. Alternatively the support material may be coated with a slurry of precipitated, thermally decomposable, copper compounds, and possibly other components as aforesaid, dried, and then calcined to convert the thermally decomposable compounds to the oxidic form. Preferably such catalysts, after reduction, contain 3 to 15% by weight of copper. The use of such catalysts made by impregnating or coating a support is advantageous where the copper-containing catalyst is employed as a preliminary catalyst bed in the same vessel as the conventional iron oxide-containing high temperature shift catalyst. The catalyst may be in the form of a random packed bed of pellets of the support, which may be a macroporous foam as described in U.S. Pat. No. 4,810,685, or monolithic, e.g. a honeycomb or a macroporous foam as aforesaid, to which the catalytic material has been applied, for example by impregnation or coating. The use of a macroporous foam as a support may be advantageous in certain cases as will be described hereinafter. One method of forming suitable impregnated catalysts involves impregnating a transition alumina support with an ammoniacal copper carbonate complex followed by heating to decompose that complex.

It is generally necessary to employ the process gas, e.g. from steam reforming, as the gas used to effect reduction of iron oxide-containing high temperature shift catalyst precursors to the active state as hydrogen in an inert diluent is liable to result in over-reduction of the iron oxide-containing catalyst precursor. However, with conventional pelleted copper-containing shift or methanol synthesis catalysts, the use of process gas for the reduction stage is liable to result in overheating of the copper-containing catalyst. By the use of a catalyst having a relatively small proportion of copper on a support, the support acts as a heat sink to minimise the risk of overheating, thus enabling reduction to be effected with the process gas in the same vessel as the high temperature shift catalyst. Alternatively, where it is desired to employ a catalyst containing a higher proportion of copper, for example above 15% by weight, the catalyst may be pre-reduced and passivated, for example by the process described in our EP 0 748 255 wherein a mixture of oxygen and carbon dioxide is employed to effect passivation.

The high temperature shift catalysts that may be employed include the iron oxide/chromia compositions normally employed for the shift reaction and may themselves contain a small proportion of copper. An example of a suitable high temperature shift catalyst is described in U.S. Pat. No. 5,656,566. Suitable catalysts preferably have an iron oxide content (expressed as $Fe_2O_3$) of 60 to 95% by weight. Preferably the iron to chromium atomic ratio in the precursor is in the range 6 to 20, particularly 8 to 12. The precursor may contain oxides of other metals, e.g. aluminium, manganese, or, especially, as mentioned above, copper. Particularly preferred precursors have an iron to copper atomic ratio of 10:1 to 100:1. Such additional oxides may be introduced by coprecipitation of suitable metal compounds that decompose upon heating to the oxides with the iron and chromium compounds. Alternatively, or additionally, such additional oxides may be incorporated by effecting the precipitation of the iron and chromium compounds in the presence of the desired additional oxides or compounds that decompose to the oxides upon heating. Alternatively, such oxides, or compounds that decompose thereto upon heating, may be added to the precipitated iron and chromium compounds before calcination and shaping into the desired pellets. Alternatively, the precipitated iron and chromium compounds, before or after calcination and forming the shaped pellets, may be impregnated with a solution of compounds that decompose upon heating to the desired additional oxides.

As indicated above, the inlet temperature to the preliminary shift stage should be in the range 280–370° C. Preferably it is in the range 280–350° C., particularly 300–330° C. As the shift reaction is exothermic, the temperature of the gas leaving the iron-free, copper-containing, preliminary shift catalyst will be somewhat higher than the shift inlet temperature. As a rule of thumb, the temperature rise for the gas compositions often encountered is about 10° C. for each 1% by volume of carbon monoxide in the gas mixture (on a dry gas basis) converted. In order to minimise the risk of hydrocarbon formation, it is generally necessary for the iron-free, copper-containing, catalyst to effect shifting of 5 to 15% of the carbon monoxide present in the shift inlet gas. The temperature rise will generally be less than about 50° C. and usually below 30° C.

Following the preliminary shift reaction, the gas mixture then undergoes the shift reaction over the iron oxide-containing high temperature shift catalyst. Although the inlet temperature to the iron-free, copper-containing, catalyst may be lower than is usually employed for high temperature shift catalysts, the exothermic reaction occurring over the iron-free, copper-containing, catalyst increases the temperature to a level at which the conventional iron oxide-containing shift catalyst is active. If, as is usual, the high temperature shift reaction over the iron oxide-containing catalyst is effected adiabatically, the temperature and carbon monoxide content of the gas leaving the high temperature shift reaction will depend on the composition of the shift inlet gas and how closely the shift equilibrium is approached. However the carbon monoxide content of the gas leaving the high temperature shift reaction is typically in the range 2–5% by volume (on a dry basis) and the outlet temperature will in the range 350–500° C. If desired, the shifted gas can be cooled and subjected to low temperature shift, e.g. at an outlet temperature in the range 200–280° C., using conventional low temperature shift catalysts.

Since the iron-free, copper-containing, preliminary shift catalyst can effect a significant amount of shift reaction, the volume of iron oxide-containing high temperature shift catalyst employed can be decreased. Typically up to 10% of the volume of iron oxide-containing high temperature shift catalyst may be replaced by the iron-free, copper-containing catalyst. Preferably the amount of iron-free, copper-containing, catalyst employed is 3–5% by volume of the iron oxide-containing catalyst. Conventional iron oxide-containing high temperature shift catalysts are usually operated at a wet gas space velocity in the range 2500 to 5000 $h^{-1}$, although some modern, highly active, iron oxide-containing, high temperature shift catalysts have been operated at higher wet gas space velocities, e.g. up to about 7500 $h^{-1}$. Operation at an overall wet gas space velocity of 5000 $h^{-1}$ but with replacement of 5% by volume of the conventional, iron oxide-containing, high temperature shift catalyst by an iron-free, copper-containing, catalyst in accordance with the present invention means that the iron-free, copper-containing, catalyst is operating at a wet gas space velocity of 100000 $h^{-1}$. Preferably the iron-free, copper-containing, catalyst is operated at a wet gas space velocity of at least 20000 $h^{-1}$, particularly at least 50000 $h^{-1}$. It will be appreciated that the volume of the iron-free copper-containing catalyst that is required will depend, inter alia, on the amount of copper in a given volume of catalyst and the accessibility of that copper to the process gas. Preferably the amount of iron-free copper-containing catalyst employed is such that the wet gas flow rate is in the range 250–3000 liters (at NTP) of wet gas per g of copper in the catalyst per hour.

In many processes, e.g. where the shift reaction follows production of a crude gas by steam reforming and/or partial oxidation, heat is recovered from the process gas prior to the shift stage. This heat recovery often involves steam raising in a boiler. Such boilers are prone to failure and leakage with the result that boiler solids, e.g. silicates and phosphates, are carried with the process gas into the shift reactor. Deposition of such solids on the shift catalyst results in blinding of the catalyst resulting in loss of activity and an increase in the pressure drop encountered by the process gas as it passes through the shift catalyst. By employing the iron-free, copper-containing, catalyst as a coated or impregnated macroporous foam, such boiler solids may tend to be trapped by the foam and hence obviate such pressure drop problems.

The invention is illustrated by the following examples.

EXAMPLE 1

A precursor to an iron-free, copper-containing catalyst was prepared by addition of an aqueous solution containing copper and zinc nitrates to a slurry of alumina trihydrate in aqueous sodium carbonate at about 60° C. The final pH of the resultant slurry was 7.2. The precipitate was aged at 60° C. for about 45 minutes and was then filtered from the mother liquor and washed. The resultant filter cake was dried overnight at 120° C., crushed, sieved through a 1.4 mm sieve and then calcined at 300° C. for 6 hours. The calcined powder was then compacted and pelleted into cylindrical pellets of diameter 5.4 mm and 3.6 mm length. The pellets has a particle density of about 2 g/cm$^3$ and had the nominal composition CuO 25% w/w, ZnO 25% w/w, Al$_2$O$_3$ 50% w/w.

About 15 ml of the pellets, containing a total of 3.2 g of copper, were mixed with 185 ml of alpha alumina chips and charged to a tubular reactor of internal diameter 37 mm. The copper oxide in the pellets was reduced to metallic copper using nitrogen containing 2% by volume of hydrogen, initially at 225° C., with the temperature then being increased to 240° C. over a period of 2 hours and then a test gas mixture was passed over the catalyst at a pressure of 28 bar abs. at a temperature of 365° C. The reactor was operated isothermally at 365° C. The test gas composition was as follows (% by volume): 13.9 CO, 6.3 CO$_2$, 53.1 H$_2$, 1.0 CH$_4$, 25.7 N$_2$, and was mixed with 50 parts by volume of steam per 100 parts of dry gas. The gas has a carbon monoxide to carbon dioxide ratio of 2.2 and a steam to dry gas ratio of 0.5. Over a period of prolonged use, such a gas is liable to effect over-reduction of an iron oxide-containing high temperature shift catalyst. To avoid that risk, the carbon monoxide to carbon dioxide ratio is desirably decreased to below about 1.9. To achieve a carbon monoxide to carbon dioxide ratio below 1.9, about 5% or more of the carbon monoxide has to be shifted to give an outlet gas having a carbon monoxide content of less than about 8.8% by volume (on a wet gas basis).

The test was carried out over a range of space velocities (liters of wet gas per liter of undiluted catalyst per hour) over a period of 5 days and the carbon monoxide content of the effluent gas, on a wet gas basis, was determined.

To simulate ageing of the catalyst through thermal sintering, the temperature was then increased to 435° C. for a period of 5 days, and then the testing at 365° C. repeated over a period of a further 5 days.

For purposes of comparison a commercially available copper-doped iron oxide-chrome high temperature shift catalyst was tested in a similar fashion. The results are shown in the following table.

| Wet gas space velocity ($h^{-1}$) | iron-free, copper-containing, catalyst | | | | Copper-doped iron oxide-chrome catalyst | | | |
|---|---|---|---|---|---|---|---|---|
| | outlet gas CO (%) | | CO/CO$_2$ ratio | | outlet gas CO (%) | | CO/CO$_2$ ratio | |
| | Initial | Retest | Initial | Retest | Initial | Retest | Initial | Retest |
| 60000 | 6.4 | 6.9 | 0.9 | 1.0 | 7.0 | 7.3 | 1.1 | 1.2 |
| 72000 | 6.6 | 7.2 | 1.0 | 1.1 | 7.3 | 7.4 | 1.2 | 1.2 |
| 86000 | 6.8 | 7.3 | 1.0 | 1.2 | — | 7.7 | — | 1.3 |
| 98000 | 7.0 | 7.7 | 1.1 | 1.3 | 7.6 | 7.8 | 1.3 | 1.4 |
| 110000 | — | 7.9 | — | 1.4 | 7.9 | 8.0 | 1.4 | 1.5 |

From the above results it is seen that the iron-free, copper-containing, preliminary shift catalyst was effective, even at high wet gas space velocities, to effect sufficient conversion of carbon monoxide to decrease the carbon monoxide to carbon dioxide ratio to below 1.9 and so it would be possible to replace the initial part, less than 5% by volume, of a conventional iron oxide-containing high temperature shift catalyst operating at a wet gas space velocity of 5000 $h^{-1}$ by the iron-free, copper containing, preliminary shift catalyst and effect sufficient conversion of carbon monoxide before the gas encountered the iron oxide-containing catalyst.

EXAMPLE 2

In this example a precursor to an iron-free, copper-containing, catalyst was prepared using a macroporous alumina foam as a support. The support was in the form of cylindrical pellets of 16 mm diameter and 16 mm height having a porosity of 35–40% and a density of about 1.3 g/cm$^3$ and was made by the process described in U.S. Pat. No. 4,810,685. The precursor was made by dipping the pellets in a slurry containing about 40% by weight of co-precipitated copper, zinc and aluminium compounds in the approximate atomic proportions of 3.4 Cu:1.7 Zn:1 Al. The impregnated support was dried and calcined at 380 to 420° C. to decompose the copper, zinc and aluminium compounds to the corresponding oxides. The resulting copper-containing foam pellets contained 1.42% by weight of copper.

45 ml of the copper containing foam pellets, i.e. containing a total of 0.59 g of copper, were crushed and mixed with 155 ml of alpha-alumina chips and charged to a tubular reactor of internal diameter 37 mm. The copper oxide in the pellets was reduced to metallic copper by passing the test gas as used in Example 1 but containing 50 parts by volume of steam per 50 parts of dry gas at a pressure of 28 bar abs. The reduction was initiated at 250° C., and the temperature was increased gradually to 440° C. and held at that temperature for 4 hours. The amount of steam in the test gas was then decreased to 50 parts by volume of steam per 100 parts of dry gas.

The temperature was decreased to 365° C. and the space velocity (liters of wet gas per liter of undiluted catalyst per hour) was varied over a period of 5 days. The carbon monoxide content of the effluent gas, on a wet basis, was determined at various space velocities. To simulate ageing of the catalyst through thermal sintering, the temperature was then increased to 400° C. for a period of 5 days and then the testing at 365° C. repeated over a further period of 5 days. To simulate a boiler leak the reactor was cooled down to room temperature and water deposited on the catalyst. This aged, wetted, catalyst was then tested at a space velocity of 20000 h$^{-1}$ at 365° C. for 5 days. The results are shown in the following table.

| Wet gas space velocity (h$^{-1}$) | outlet gas CO (%) | | | CO/CO$_2$ ratio | | |
|---|---|---|---|---|---|---|
| | Initial | Retest | after wetting | Initial | Retest | after wetting |
| 20000 | 3.7 | 5.5 | 6.3 | 0.4 | 0.7 | 0.9 |
| 24000 | 4.1 | 5.9 | — | 0.4 | 0.8 | — |
| 28000 | 4.3 | 6.2 | — | 0.5 | 0.9 | — |
| 32500 | 4.5 | 6.4 | — | 0.5 | 0.9 | — |
| 37000 | 4.7 | 6.7 | — | 0.5 | 1.0 | — |

EXAMPLE 3

Example 2 was repeated but using a slurry containing 60% by weight of the co-precipitated copper, zinc and aluminium compounds. The resulting copper-containing foam pellets contained 1.94% by weight of copper. The 45 ml of foam pellets contained a total of 0.85 g of copper. The results are shown in the following table.

| Wet gas space velocity (h$^{-1}$) | outlet gas CO (%) | | | CO/CO$_2$ ratio | | |
|---|---|---|---|---|---|---|
| | Initial | Retest | after wetting | Initial | Retest | after wetting |
| 20000 | 3.6 | 5.2 | 6.3 | 0.4 | 0.6 | 0.9 |
| 24000 | 3.8 | 5.6 | — | 0.4 | 0.7 | — |
| 28000 | 4.2 | 5.8 | — | 0.5 | 0.8 | — |
| 32500 | 4.7 | 6.0 | — | 0.5 | 0.8 | — |
| 37000 | 4.4 | 6.3 | — | 0.5 | 0.9 | — |

EXAMPLE 4

Example 2 was repeated but instead of using a slurry of the copper, zinc and aluminium compounds, the latter were homogeneously precipitated in the presence of the foam pellets by dipping the foam pellets into an aqueous solution containing copper, zinc and aluminium nitrates and urea. The solution was made up by adding 212.85 g of urea to 500 ml of an aqueous solution containing 302 g of Cu(NO$_3$)$_2$.3H$_2$O, 145.77 g of Zn(NO$_3$)$_2$.6H$_2$O and 48.77 g of Al(NO$_3$)$_3$.9H$_2$O.

The excess of the solution was drained from the pellets and then the latter were calcined at 450° C. The pellets contained 4.38% by weight of copper 0.25 ml of the copper containing foam pellets, containing a total of 0.92 g of copper, were crushed and mixed with 175 ml of alpha-alumina chips and charged to a tubular reactor of internal diameter 37 mm. The copper oxide in the pellets was reduced to metallic copper by passing the test gas as used in Example 1 but containing 50 parts by volume of steam per 50 parts of dry gas at a pressure of 28 bar abs. The reduction was initiated at 250° C., and the temperature was increased gradually to 440° C. and held at that temperature for 4 hours. The amount of steam in the test gas was then decreased to 50 parts by volume of steam per 100 parts of dry gas.

The temperature was decreased to 365° C. and the space velocity (liters of wet gas per liter of undiluted catalyst per hour) was varied over a period of 5 days. The carbon monoxide content of the effluent gas, on a wet basis, was determined at various space velocities. The results are shown in the following table.

| Wet gas space velocity (h$^{-1}$) | outlet gas CO (%) | CO/CO$_2$ ratio |
|---|---|---|
| 36000 | 7.6 | 1.3 |
| 43500 | 7.8 | 1.4 |
| 51000 | 8.0 | 1.5 |
| 58500 | 8.1 | 1.5 |
| 66000 | 8.2 | 1.5 |

EXAMPLE 5

The procedure of Example 4 was repeated except that only 87.65 g of urea, instead of 212.85 g, was added to the 500 ml of the solution of copper, zinc and aluminium nitrates, and, after calcination, the impregnated pellets were again dipped into the solution, drained and calcined. This re-dipping, draining and calcination was repeated a further time. The resultant pellets contained 9.01% by weight of copper.

The pellets were tested as in Example 4. The results are shown in the following table.

| Wet gas space velocity ($h^{-1}$) | outlet gas CO (%) | CO/$CO_2$ ratio |
|---|---|---|
| 36000 | 5.7 | 0.7 |
| 43500 | 5.9 | 0.8 |
| 51000 | 6.3 | 0.9 |
| 58500 | 6.6 | 0.9 |
| 66000 | 6.8 | 1.0 |

What is claimed is:

1. A shift process comprising contacting a gas stream containing carbon monoxide and steam with an iron-free, copper-containing catalyst at an inlet temperature in the range of 280–370° C., and contacting the resulting gas stream with an iron oxide-containing catalyst, wherein the iron-free, copper-containing, catalyst comprises the product of reducing a support impregnated or coated with copper compound such that the iron-free, copper-containing catalyst contains from 1.42 to 15% by weight of copper.

2. A process according to claim 1, wherein the iron-free, copper-containing catalyst contains 3 to 15% by weight of copper.

3. A process according to claim 1, wherein the inlet temperature is in the range 280–330° C.

4. A process according to claim 1, wherein the iron-free, copper-containing, catalyst is operated at a wet gas space velocity of at least 50000 $h^{-1}$.

5. A process according to claim 1, wherein the amount of iron-free copper-containing catalyst is such that the wet gas flow rate is in the range 250–3000 liters (at NTP) of wet gas per g of copper in the catalyst per hour.

6. A process according to claim 1, wherein the gas fed to the iron-free, copper-containing, catalyst contains hydrogen and carbon dioxide in addition to carbon monoxide and steam and has a carbon monoxide to carbon dioxide molar ratio above 1.9.

7. A process according to claim 1, wherein the iron-free, copper-containing, catalyst effects conversion of 5 to 15% of the carbon monoxide in the gas fed to the iron-free, copper-containing, catalyst.

8. A process according to claim 1, wherein the gas fed to the iron-free, copper-containing, catalyst has a steam to dry gas ratio in the range 0.2 to 0.6.

9. A process according to claim 1, wherein the iron-free copper-containing catalyst comprises zinc at a zinc:copper weight ratio of from 1:1 to 1:2.5.

10. A process according to claim 1, wherein the inlet temperature is from 300° C. to 330° C.

11. A process according to claim 1, wherein the temperature rise resulting from contacting the gas stream with the iron-free, copper-containing catalyst is less than 50° C.

12. A process according to claim 1, wherein the temperature rise resulting from contacting the gas stream with the iron-free, copper-containing catalyst is less than 30° C.

13. A process according to claim 1, wherein the volume of the iron-free, copper containing catalyst is from 3 to 5% by volume of the iron-oxide containing catalyst.

* * * * *

UNITED STATES PATENT AND TRADEMARK OFFICE
CERTIFICATE OF CORRECTION

PATENT NO. : 6,500,403 B2  
DATED : December 31, 2002  
INVENTOR(S) : Andrew M. Ward It is certified that error appears in the above-identified patent and that said Letters Patent is hereby corrected as shown below:

<u>Title page,</u>
Item [30], insert the following:

-- [30]   Foreign Application Priority Data

September 23, 1998   (GB) ………….. 9820608.9 --

Signed and Sealed this

Twenty-second Day of April, 2003

JAMES E. ROGAN
*Director of the United States Patent and Trademark Office*